March 29, 1966  C. A. BURDEN  3,243,568
ELECTRIC WELDING PROCESS
Filed Aug. 7, 1964  2 Sheets-Sheet 1

Inventor
CLIVE ALBERT BURDEN
By
Townshend & Maserole
Attorneys

March 29, 1966 C. A. BURDEN 3,243,568
ELECTRIC WELDING PROCESS
Filed Aug. 7, 1964 2 Sheets-Sheet 2
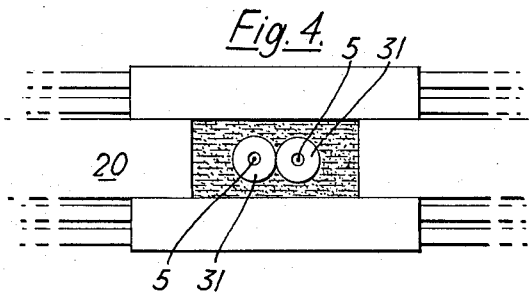
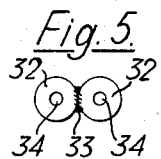
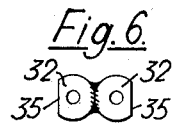
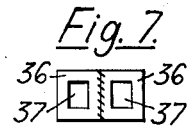
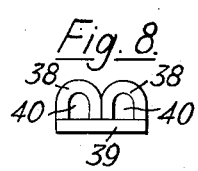
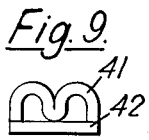
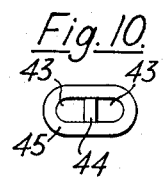
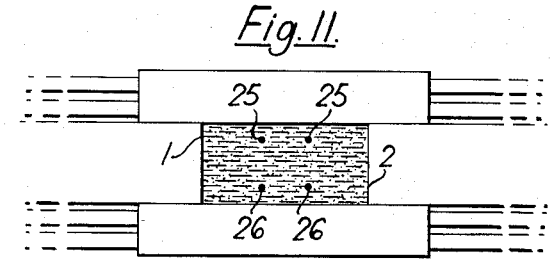
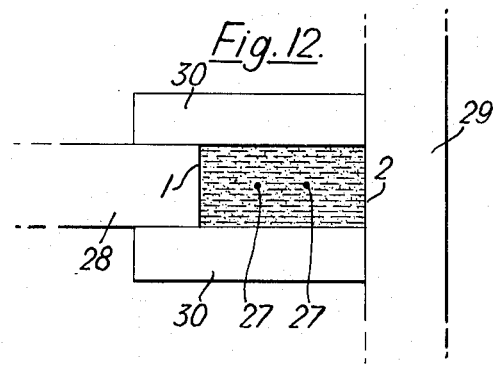
Inventor
CLIVE ALBERT BURDEN
By Townshend & Meserole
Attorneys United States Patent Office 3,243,568
Patented Mar. 29, 1966

3,243,568
ELECTRIC WELDING PROCESS
Clive Albert Burden, Amersham, England, assignor to The British Oxygen Company Limited, a British company
Filed Aug. 7, 1964, Ser. No. 388,105
Claims priority, application Great Britain, Aug. 7, 1963, 31,175/63; Feb. 21, 1964, 7,378/64
4 Claims. (Cl. 219—73)

This invention relates to electric welding processes for butt welding metal plates and other members and is particularly concerned with welding processes of the electroslag type. For the purpose of the present specification the term "welding process of the electroslag type" is defined as a welding process in which the opposing surfaces to be welded are arranged upright with an intervening gap, the sides of which are closed by damming members, and in which a weld pool in the gap is supplied with weld metal from above by means of one or more electrodes through which current flows to the surface of the weld pool. This term is intended to embrace both electroslag welding in which the weld pool includes a layer of molten slag which is maintained over the upper surface of the molten weld metal, and electrogas welding in which this upper surface may be only partly covered by molten slag but in which additional protection from the atmosphere is provided by a shielding gas.

In practice the two surfaces to be welded are arranged substantially vertically but it will be appreciated that small departures from the vertical are possible and the term "upright" is intended to cover these. In practice also the damming members referred to above take the form of sliding copper shoes which are raised up the gap between the two members being welded as the work proceeds. With such a process it is possible to weld seams over twenty feet long in pressure vessels formed of plates of ten inches in thickness. Welds of this magnitude may take more than a normal working day of continuous welding to produce, even when the setting-up time is disregarded, and once welding has started it is undesirable to interrupt the operation. Any possibility of reducing the welding time by increasing the welding speed is therefore of great interest.

It has been found, however, that increase of welding speed much above a certain value, say three feet per hour on restrained joints in two inch plate tends to produce "centre-line cracking" along the length of the weld and/or tends to reduce the chances of the weld metal meeting bend-test requirements.

Investigations of electroslag welds made at high speed under normal conditions indicate that centre-line cracking may be due to the fact that dendritic grain growth in the deposited metal starts from the opposing edge faces of the plates being welded together and these crystal structures meet approximately in a plane in the centre of the weld parallel to these opposing edge faces, so producing a plane of weakness in the weld. The effect obtained is illustrated diagrammatically in FIGURE 1 of the accompanying drawings. In this figure the surfaces being welded are indicated as 1 and 2 and the molten weld pool as 3. This is topped by a layer of molten slag 4 into which an electrode 5 projects to supply the necessary metal to the weld pool. An electrode guide shown in dotted lines as 6 may also be used. The molten metal in the pool 3 solidifies along isotherms indicated as 11 and 12 respectively and below these lines the metal is solid. The grain growth occurs at right angles to the isotherms 11 and 12 as indicated by the hatching in the drawing and it will be seen that the lines of grain growth meet along the centre line shown as 13 which, in fact, represents a plane through the centre of the weld. It is along this plane representing the meeting of the two differently orientated crystal structures that the weakness occurs.

According to the present invention weld metal is supplied to the molten pool along a line approximately perpendicular to the surfaces being welded. Preferably this is achieved by the use of two electrode wires spaced apart along the said line but a strip electrode which enters the pool along the line may also be used. The improved effect obtained is illustrated diagrammatically in FIGURE 2 of the accompanying drawings.

Similar components are again shown by the same reference numerals as in FIGURE 1 and it will be seen that two separate electrodes 5 are used which enter the weld pool 3 from above along a line approximately perpendicular to the surfaces 1 and 2. Owing to the fact that the supply of weld metal is distributed laterally as seen in FIGURE 2 the isotherms take up a different configuration consisting of lines shown as 15 and 16 which are similar to the lines 11 and 12 in FIGURE 1 except that instead of meeting at a point they are joined by a portion 17 generally parallel with the surface of the weld pool 3. The grain growth at right angles to the isotherms as previously, is again represented by the hatching and it will be seen that there is no longer the central plane of weakness. Instead of this there is a more gradual transition from the direction of grain growth at one side of the weld to that of the other side. Macro examination of electroslag welds produced in this way reveals an equi-axed finer grained structure interposed between the dendritic structures extending from the opposing edge faces of the members.

The electrode may be fed to the weld pool either by means of feeding mechanism which is raised as the work proceeds or alternatively the electrodes may be fed down consumable metal guides by means of feeding mechanism which is kept stationary at the top of the gap between the two surfaces to be welded. Both of these methods of feeding the electrodes are known in themselves in connection with electroslag welding and both may be used in a process in accordance with the present invention. When using the two electrode wires a common consumable guide is preferably employed formed with separate passages for the individual electrode wires.

Processes in accordance with the invention will now be described in more detail with reference to FIGURES 3 to 12 of the accompanying drawings in which:

FIGURE 4 is a plan view of a similar weld using two electrodes with guides.

FIGURES 5 to 10 are plan views of electrode guides suitable for use with the process of FIGURE 4.

FIGURE 11 is a plan view of a modification of the process of FIGURE 3; and

FIGURE 12 is a plan view of a further modification as applied to a T-butt weld.

Figure 3:
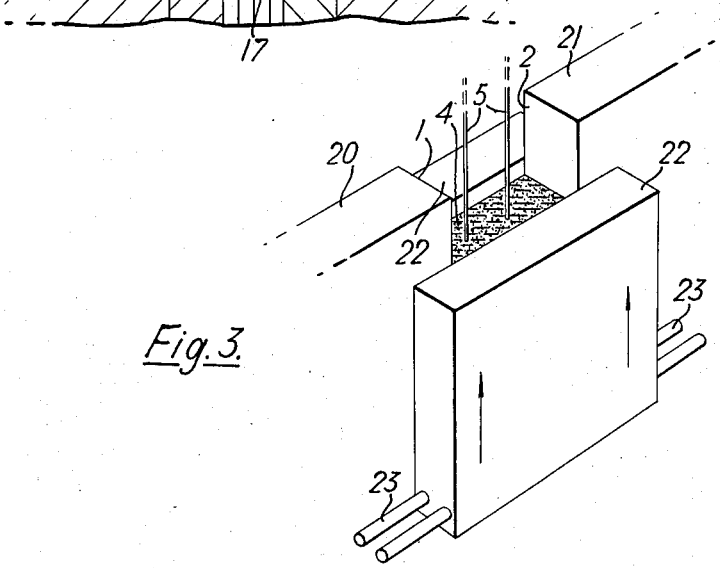
FIGURE 3 is a perspective view showing the process as used for butt welding two plates by means of electrode wires without guides.

Turning first to FIGURE 3 the surfaces to be welded are again shown as 1 and 2 and the molten slag as 4. The surfaces 1 and 2 are formed by the edges of plates 20 and 21 which are set up with their edges 1 and 2 vertical, the gap between them being closed by damming members in the form of copper shoes shown diagrammatically as 22. These are raised as the work progresses by means of mechanism (not shown) and are water cooled by way of pipes 23. Two electrode wires 5 are fed downwardly into the molten slag 4 by means of feeding mechanism (not shown) which is also raised as the work progresses.

The electrode wires enter the weld pool at opposite sides of the center line of the weld seam, that is, they are spaced laterally from a verttical plane passed through the center line of the weld seam perpendicular to the opposed vertical faces of the shoes 22. They enter the weld from above and at points on the pool surfaces which lie in a single horizontal line that intersects the opposed vertical surfaces to be welded approximately perpendicular thereto. Otherwise stated: the line at the surface of the weld pool along which weld metal is supplied to the pool lies entirely within a vertical plane that is perpendicular of approximately so to a vertical plane passed through the center line of the weld seam perpendicular to the shoes 22. Accordingly, the pool surface line along which weld metal is supplied is parallel or substantially so to the opposed faces of the shoes. In this way increased welding speeds can be obtained with markedly less tendency to center-line cracking.

Figure 1:
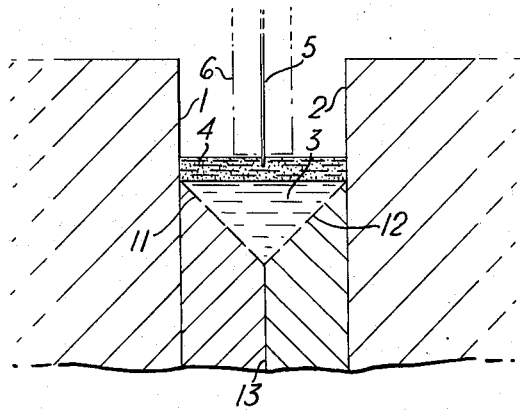
FIGURE 1 is a diagramatic vertical sectional view illustrating the conventional method of electroslag welding ends of thick metal plates.
Figure 2:
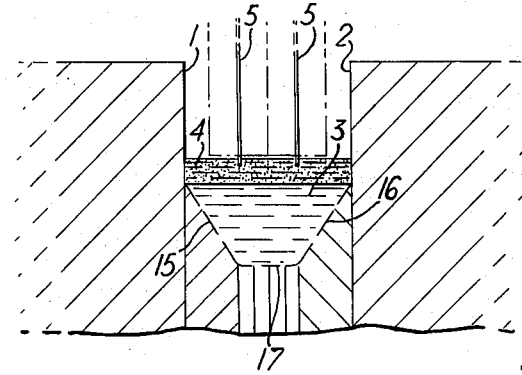
FIGURE 2 is a similar view, but illustrating the method of the present invention.

Typical conditions for a butt weld of the kind illustrated in FIGURE 3 but using the normal electrode arrangement (i.e. to give the effect illustrated in FIGURE 1) include a welding current supplied through the electrode wire of 650 amperes at 45 volts and with an electrode wire feed speed of 128 inches per minute. Welding speed may be approximately four feet per hour up the seam. Slag bath depth is usually 2½ inches.

In carrying out the process as illustrated in FIGURE 3, however, again using two inch plates somewhat different conditions were observed. Thus the welding current supplied was 1350 amperes D.C. at 35 volts and the total wire feed speed was 420 inches per minute. The depth of the slag bath 4 was approximately 1½ inches, the slag having a relatively high electrical conductivity and low viscosity such as that produced by a flux composition of the kind described in the copending U.S. patent application of Buckingham Serial No. 264,062. Both electrode wires had the same dimeter as that used in the typical normal electroslag weld. With the process of the present invention, however, a welding speed up the seam of 12½ feet per hour was observed.

With three inch plate the process of the present invention has enabled welding speeds of over 8 feet per hour to be obtained whereas the normal single electrode wire process produces similar welds at three feet per hour.

For plates thicker than about three inches two pairs of electrode wires may be used each spaced apart along parallel lines as illustrated in FIGURE 11. The arrangement illustrated is intended for use with plates having a thickness for example of four or five inches in which case two pairs of electrodes 25 and 26 are used. It will be seen that the two electrodes 25 are spaced on a line perpendicular to the two surfaces 1 and 2 as are also the electrodes 26. In the arrangement of FIGURE 12 the surfaces to be welded are again shown as 1 and 2 and the electrodes shown as 27 are again arranged on a line perpendicular to these two surfaces. The surface 1 forms the edge of a plate 28 while the surface 2 forms part of the face of a plate 29. Copper shoes 30 are again used to close the gap between the two surfaces.

Referring back to FIGURE 4 this illustrates a process similar to that of FIGURE 3 in which the electrode wires 5 are surrounded by consumable guides 31. As previously mentioned the use of such guides is known in itself but in particularly advantageous in a process according to the invention. Not only do these guides avoid the need for raising the electrode feed mechanism but they also contribute to the weld metal in the pool. Preferably the two guides 31 form part of a common structure examples of which are shown in FIGURES 5 to 10. In FIGURE 5 a common guide consists of two tubes 32 welded side by side at 33 and formed with separate passages 34 for the individual electrode wires. FIGURE 6 shows a similar arrangement except that opposite edges of the tubes 32 are flattened at 35 so that these faces can engage the surfaces being welded and thus assist in guiding the electrodes. In FIGURE 7 two tubes 36 each of rectangular section are welded side by side to provide individual rectangular shaped passages 37 for the electrode wires. In FIGURE 8 a similar result is achieved by welding together two U-shaped members 38 and a flat strip 39 to give two passages 40. In FIGURE 9 an equivalent result is obtained by welding a single member 41 to a flat strip 42. Finally in FIGURE 10 two separate passages 43 are provided by welding a partition 44 down the centre of a flattened tube 45. In each of the FIGURES 5 to 10 the guides are shown as bare but they may, if required, be given an insulating coating which may be of slag-forming material.

The electroslag welds produced by the process of the present invention were satisfactory from a metallurgical viewpoint despite the high welding speeds attained. This appears to result from the improved crystal structure produced in the weld and from the narrower heat-affected zone. For a unit length of weld the present invention may produce a heat input of only a half that normally occurring with the conventional single wire process.

The factors producing the relatively low heat input with the present invention are the use of a lower voltage, the faster welding speed resulting from the substantially increased welding current, and the use of a shallower slag bath.

I claim:

1. A method of welding by an electroslag type process, in which weld metal is supplied to the molten weld pool along a line approximately perpendicular to the surfaces being welded.

2. A method according to claim 1, in which the weld metal is supplied by two electrode wires spaced apart along the said line.

3. A method according to claim 2, in which the weld metal is supplied by two pairs of electrode wires each spaced apart along parallel lines that are approximately perpendicular to the surfaces being welded.

4. A method of welding by an electroslag type process in which weld metal is supplied to the molten weld pool at points along a line perpendicular to the surfaces being welded, said points lying on both sides of the center line parallel to said surfaces whereby an equi-axed crystal structure is interposed in the weld seam between the dendritic crystal structures extending from said surfaces.

References Cited by the Examiner

UNITED STATES PATENTS

| | | | |
|---|---|---|---|
| 2,654,015 | 9/1953 | Landis et al. | 219—73 |
| 2,868,951 | 1/1959 | Shrubsall | 219—74 |
| 2,997,571 | 8/1961 | Smout | 219—126 |
| 3,024,352 | 3/1962 | Danhier | 219—126 |
| 3,170,430 | 2/1965 | Bistak | 113—136 |

RICHARD M. WOOD, *Primary Examiner.*